US012543002B2

(12) United States Patent
Lehtiniemi et al.

(10) Patent No.: US 12,543,002 B2
(45) Date of Patent: Feb. 3, 2026

(54) HEADSET AUDIO

(71) Applicant: Nokia Technologies Oy, Espoo (FI)

(72) Inventors: Arto Juhani Lehtiniemi, Lempäälä (FI); Miikka Tapani Vilermo, Siuro (FI); Lasse Juhani Laaksonen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 300 days.

(21) Appl. No.: 18/330,760

(22) Filed: Jun. 7, 2023

(65) Prior Publication Data

US 2023/0421958 A1 Dec. 28, 2023

(51) Int. Cl.
*H04R 5/04* (2006.01)
*G10K 11/178* (2006.01)
*H04R 1/10* (2006.01)

(52) U.S. Cl.
CPC ......... *H04R 5/04* (2013.01); *G10K 11/17823* (2018.01); *G10K 11/17885* (2018.01); *H04R 1/1041* (2013.01); *H04R 2460/01* (2013.01)

(58) Field of Classification Search
CPC ..... H04R 5/04; H04R 1/1083; H04R 2460/01
See application file for complete search history.

(56) References Cited

U.S. PATENT DOCUMENTS

2004/0175008 A1 9/2004 Roeck et al.
2010/0166206 A1 7/2010 Macours

FOREIGN PATENT DOCUMENTS

WO 2007/017809 A1 2/2007

OTHER PUBLICATIONS

Extended European Search Report received for corresponding European Patent Application No. 22180330.7, dated Nov. 30, 2022, 8 pages.
Kajikawa et al., "Recent advances on active noise control: open issues and innovative applications", APSIPA Transactions on Signal and Information Processing , vol. 1 , Dec. 2012, pp. 1-21.

*Primary Examiner* — Ping Lee
(74) *Attorney, Agent, or Firm* — McCarter & English, LLP

(57) ABSTRACT

An apparatus comprising:
- means for receiving one or more left ear microphone signals;
- means for receiving one or more right ear microphone signals;
- means for boosting a left ear sound signal in dependence upon the received one or more right ear microphone signals;
- means for boosting a right ear sound signal in dependence upon the received one or more left ear microphone signals.

20 Claims, 5 Drawing Sheets

HEADSET AUDIO

TECHNOLOGICAL FIELD

Embodiments of the present disclosure relate to headset audio. Some relate to mitigating the effects of external noise on headset audio as perceived by a listener.

BACKGROUND

A person can wear a headset to listen to audio. Often the headset comprises one or two ear devices. An ear device is normally designed to be placed over, on or in an ear, sometimes specifically the left ear or the right ear. One or more transducers are used in an ear device to convert sound signals to sound waves.

Exterior noise, that is sound outside the ear device can reach the user's ear drum and affect their listening.

Passive noise cancelling can be used to reduce the noise. For example, ear devices can be designed to be closely fitting and, in some examples, can comprise sound absorbent material.

Active noise cancellation (ANC) estimates the noise that would reach a listener's ear and adapts the sound signals to cancel that estimated noise. The noise can be estimated using a feed-forward approach that uses one or more noise signals measured using one or more exterior microphones on the same ear device and/or using a feed-back approach that uses one or more noise signals measured using one or more interior microphones of the same ear device.

BRIEF SUMMARY

According to various, but not necessarily all, embodiments there is provided an apparatus comprising:

- means for receiving one or more left ear microphone signals;
- means for receiving one or more right ear microphone signals;
- means for boosting a left ear sound signal in dependence upon the received one or more right ear microphone signals;
- means for boosting a right ear sound signal in dependence upon the received one or more left ear microphone signals In some but not necessarily all examples, the means for boosting a left ear sound signal in dependence upon the received one or more right ear microphone signals is configured to boost the left ear sound signal, not the right ear sound signal, in dependence upon the received one or more right ear microphone signals and

- wherein the means for boosting a right ear sound signal in dependence upon the received one or more left ear microphone signals is configured to boost the right ear sound signal, not the left ear sound signal, in dependence upon the received one or more left ear microphone signals.

In some but not necessarily all examples, the means for boosting a left ear sound signal in dependence upon the received one or more right ear microphone signals is configured to add audio content to the left ear sound signal from the right ear sound signal; and wherein the means for boosting a right ear sound signal in dependence upon the received one or more left ear microphone signals is configured to add audio content to the right ear sound signal from the left ear sound signal.

In some but not necessarily all examples, the means for boosting a left ear sound signal in dependence upon the received one or more right ear microphone signals is configured to move audio content from the right ear sound signal to the left ear sound signal; and wherein the means for boosting a right ear sound signal in dependence upon the received one or more left ear microphone signals is configured to move audio content to the right ear sound signal from the left ear sound signal.

In some but not necessarily all examples, the means for boosting a left ear sound signal in dependence upon the received one or more right ear microphone signals is configured to pan an instrument from the right ear sound signal to the left ear sound signal; and wherein the means for boosting a right ear sound signal in dependence upon the received one or more left ear microphone signals is configured to pan an instrument from the left ear sound signal to the right ear sound signal In some but not necessarily all examples, the means for boosting a left ear sound signal is configured to amplify the left ear sound signal wherein the means for boosting a right ear sound signal is configured to amplify the right ear sound signal.

In some but not necessarily all examples, the means for boosting a left ear sound signal is configured to perform frequency-selective amplification on the left ear sound signal wherein the means for boosting a right ear sound signal is configured to perform frequency-selective amplification on the right ear sound signal.

In some but not necessarily all examples, the means for boosting the left ear sound signal is configured to perform frequency-selective amplification on the left ear sound signal, wherein the frequency-selection is dependent upon the received one or more right ear microphone signals and wherein the means for boosting the right ear sound signal is configured to perform frequency-selective amplification on the right ear sound signal, wherein the frequency-selection is dependent upon the received one or more left ear microphone signals.

In some but not necessarily all examples, the apparatus comprises means for:

- determining a left-ear noise signal associated with the received one or more left ear microphone signals;
- determining a right-ear noise signal associated with the received one or more right ear microphone signals;
- comparing the left-ear noise signal and the right-ear noise signal to determine if there is more noise to the left or to the right; and
- in dependence upon determining that there is more noise on the left than the right, boosting the right ear sound signal in dependence upon the received one or more left ear microphone signals and
- in dependence upon determining that there is more noise on the right than the left, boosting the left ear sound signal in dependence upon the received one or more right ear microphone signals.

In some but not necessarily all examples, the apparatus comprises means for:

- determining a left-ear noise signal associated with the received one or more left ear microphone signals;
- determining a right-ear noise signal associated with the received one or more right ear microphone signals;
- comparing the left-ear noise signal to a first threshold;
- in dependence upon determining that the noise on the left exceeds the first threshold,
- boosting the right ear sound signal in dependence upon the received one or more left ear microphone signals;

comparing the right-ear noise signal to a second threshold;

in dependence upon determining that the noise on the right exceeds the second threshold, boosting the left ear sound signal in dependence upon the received one or more right ear microphone signals.

In some but not necessarily all examples, the first threshold is a relative threshold set in comparison to the noise on the right or is an absolute threshold and/or wherein the second threshold is a relative threshold set in comparison to the noise on the left or is an absolute threshold.

In some but not necessarily all examples, the apparatus comprises means for attenuating the left ear sound signal and the right ear sound signal to create a safety headroom for boosting the left ear sound signal in dependence upon the received one or more right ear microphone signals and/or boosting the right ear sound signal in dependence upon the received one or more left ear microphone signals.

In some but not necessarily all examples, the apparatus comprises means for controlling a timing of boosting the left ear sound signal in dependence upon the received one or more right ear microphone signals and controlling a timing of boosting the right ear sound signal in dependence upon the received one or more left ear microphone signals, wherein if the left ear sound signal or the right ear sound signal comprises speech, boosting occurs at a pause in speech; and/or if the left ear sound signal or the right ear sound signal comprises music, boosting occurs immediately before a beat in the music.

According to various, but not necessarily all, embodiments there is provided a computer program that when run by one or more processors causes:

boosting a left ear sound signal in dependence upon a received one or more right ear microphone signals; and boosting a right ear sound signal in dependence upon a received one or more left ear microphone signals According to various, but not necessarily all, embodiments there is provided a method comprising:

receiving one or more left ear microphone signals;

receiving one or more right ear microphone signals;

boosting a left ear sound signal in dependence upon the received one or more right ear microphone signals or a right ear sound signal in dependence upon the received one or more left ear microphone signals According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
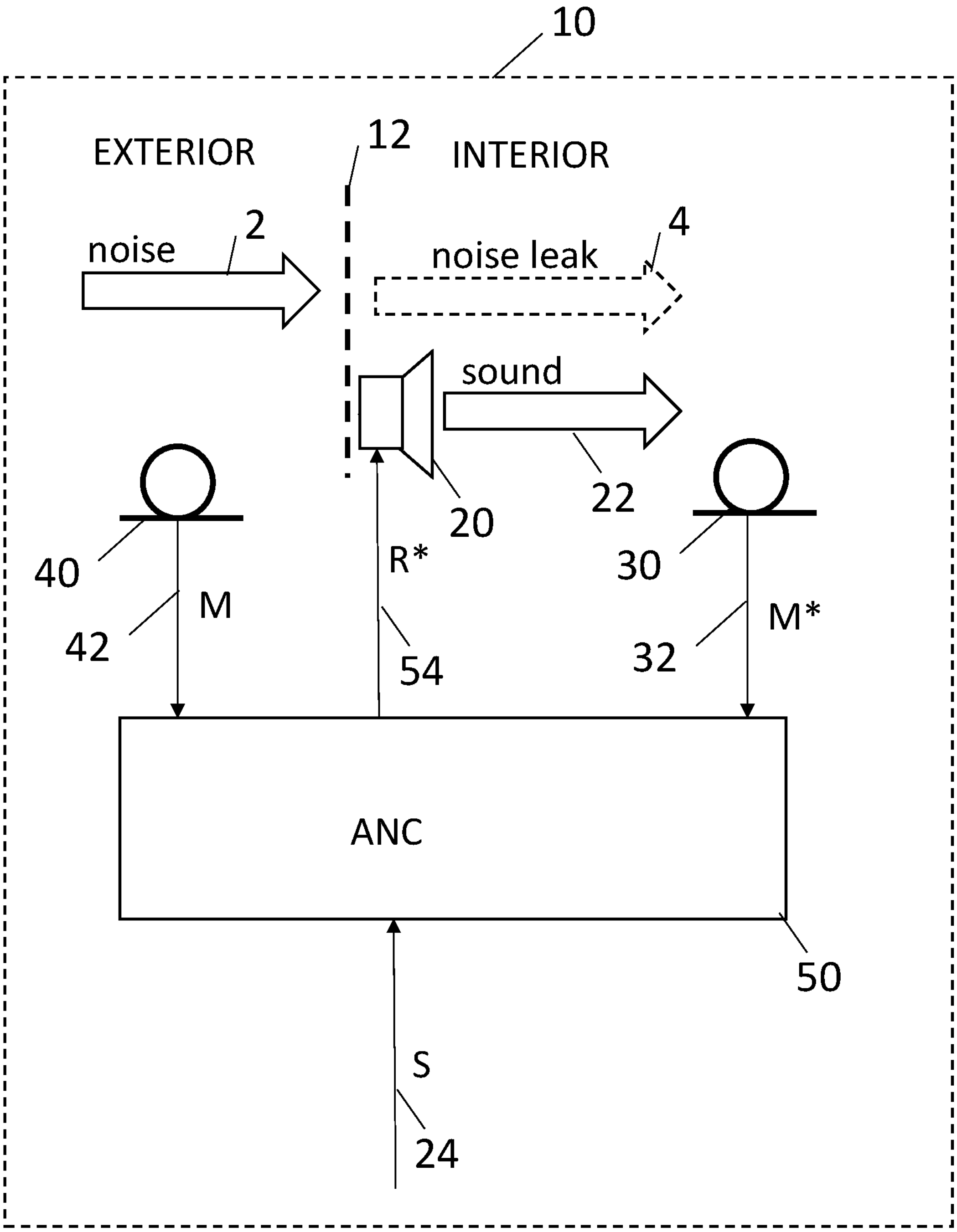
FIG. 1 shows an example of the subject matter described herein.

FIG. 1 illustrates an example of an apparatus 10 performing active noise cancellation for one ear. The FIG is divided into a region to the left that represents an exterior space and a region to the right that represents an interior space. The apparatus 10 provides a physical sound barrier 12 that separates the exterior space from the interior space. In some examples, the sound barrier 12 can be provided by an over-ear cup that fits over and surrounds the pinna (auricle) of the ear that projects from the user's head. In some examples, the sound barrier 12 can be provided by an on-ear device that rests on the user's pinna (auricle). In some examples, the sound barrier 12 can be provided by an in-ear device, such as an ear bud, that fits into the user's external auditory canal.

The sound barrier 12 provides some attenuation of exterior noise 2 such that only attenuated interior noise 4 reaches the interior space. The interior noise 4 is often referred to as a noise leak.

The apparatus 10 comprises an interior audio transducer 20 that produces interior sound 22 in dependence upon a sound signal 24.

The apparatus 10 comprises an interior microphone 30 that is within the interior space. The interior microphone 30 produces interior microphone signals 32 in dependence upon the sound field at the interior microphone 30. This sound field comprises the interior noise 4 and the interior sound 22.

The apparatus 10 optionally comprises an exterior microphone 40 that is within the exterior space, not the interior space. The exterior microphone 40 produces exterior microphone signals 42 in dependence upon the sound field at the exterior microphone 40. This sound field comprises the exterior noise 2.

The apparatus 10 comprises a controller 50 that is configured to automatically modify the sound signal 24 to fully or partially cancel the sound waves causing the interior noise 4. The modified sound signal, the controlled sound signal 54, is provided to the interior audio transducer 20 instead of the sound signal 24. The controller 50 therefore performs active noise cancellation (ANC).

In the example illustrated, let the sound signal 24 be S, the exterior microphone signal 42 be M, the interior microphone signal 32 be M*. These signals are received as inputs by the controller 50. Let the controlled sound signal 54 be R*, it is the output of the controller 50.

The controlled sound signal 54, R*, is a function of the sound signals 24 (S), the exterior microphone signal 42 (M), and the interior microphone signal 32 (M*) such that the controlled sound signal 54 (R*) fully or partially cancels the noise signal (interior noise 4). Cancellation can be achieved by using an ANC anti-phase function. The ANC anti-phase function adds an anti-phase version of an audio signal to the audio signal to cancel that audio signal.

Active noise cancellation is based on a feedback loop using an error microphone 40, the interior microphone 30. Active noise cancellation can be based on a feedback loop using a reference microphone, the exterior microphone 40.

There follows a simplified explanation of one example of active noise cancellation (ANC).

Let the residual sound signal (after feed forward ANC using the exterior microphone 40)=R $$R=S+[k\cdot M] \quad \text{\{Equation 1\}}$$

where k is an attenuation factor and [ ] represents the ANC anti-phase function.

The residual sound signal (after feed forward ANC using the exterior microphone 40) is the sum of the original sound signal S and an anti-phase version of the attenuated external microphone signal M. The attenuation can be amplitude and/or frequency selective. It is expected that [k·M] cancels the noise, leaving S remaining.

If it does not, the residual noise can be estimated using the internal microphone signal M* as S−M*, and the antiphase of this can be used as a correction to the residual signal R.

Let the residual sound signal (after feed back ANC using interior microphone 30)=R*

$$R^*=R+[S-M^*] \quad \{\text{Equation 2}\}$$

The difference between the target signal S and the internal microphone signal M* represents an estimate of the remaining current noise leakage. The residual sound signal (after feed back ANC using the interior microphone 30) is the sum of the residual signal R and an anti-phase version of the estimated remaining noise.

Combining Equation 1 and Equation 2:

$$R^*=S+[k\cdot M]+[S-M^*]$$

Different algorithms can be used for active noise cancellation. In some examples, multiple internal microphones are used for each interior space. In some examples, multiple external microphones are used for each exterior space. Thus, ANC for a single audio transducer can receive as input one or more internal microphone signals from different internal microphones from the same interior space (same side of head) and can receive as input one or more external microphone signals from different external microphones from the same exterior space (same side of head).

Figure 2:
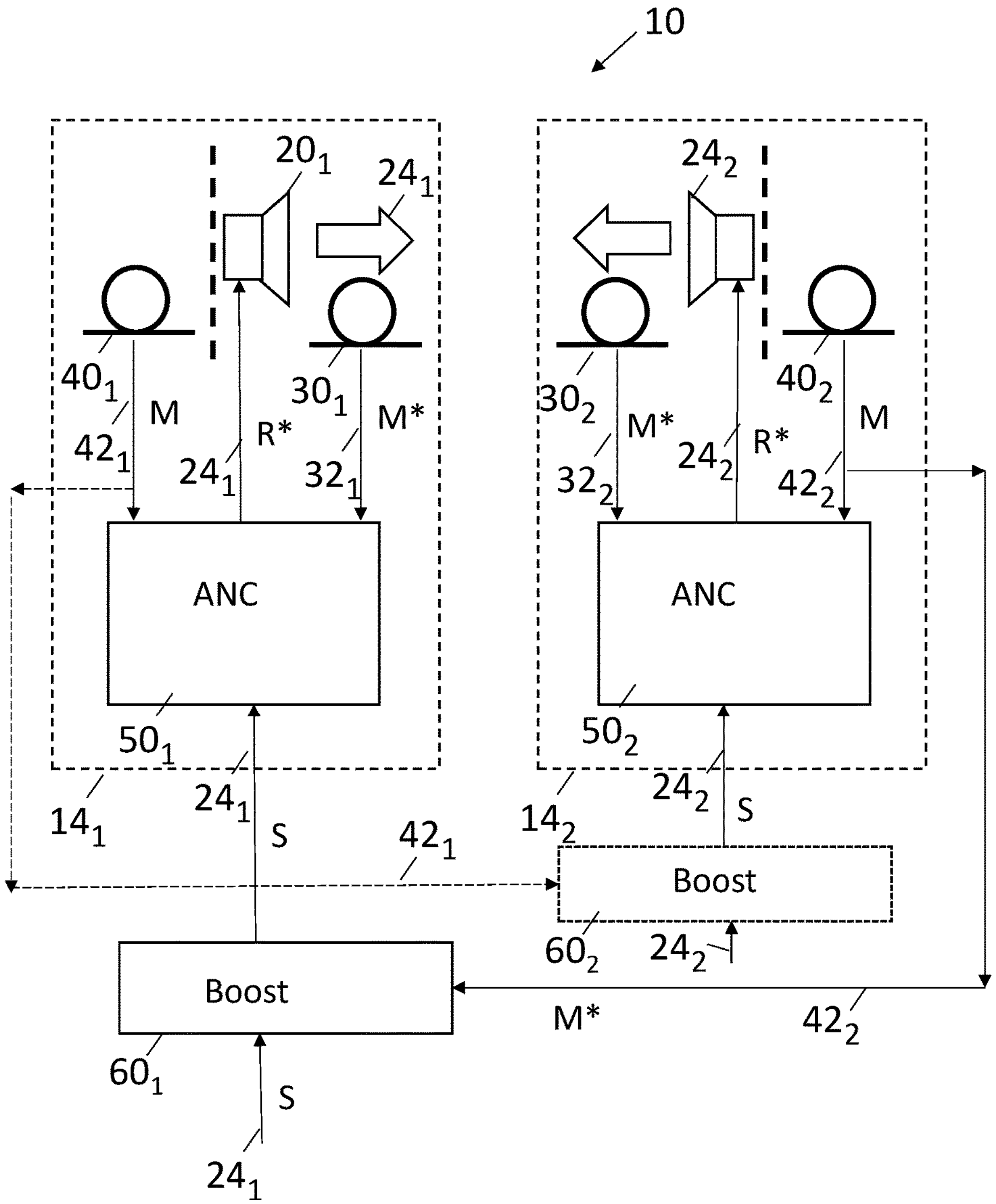
FIG. 2 shows another example of the subject matter described herein.
Figure 3:
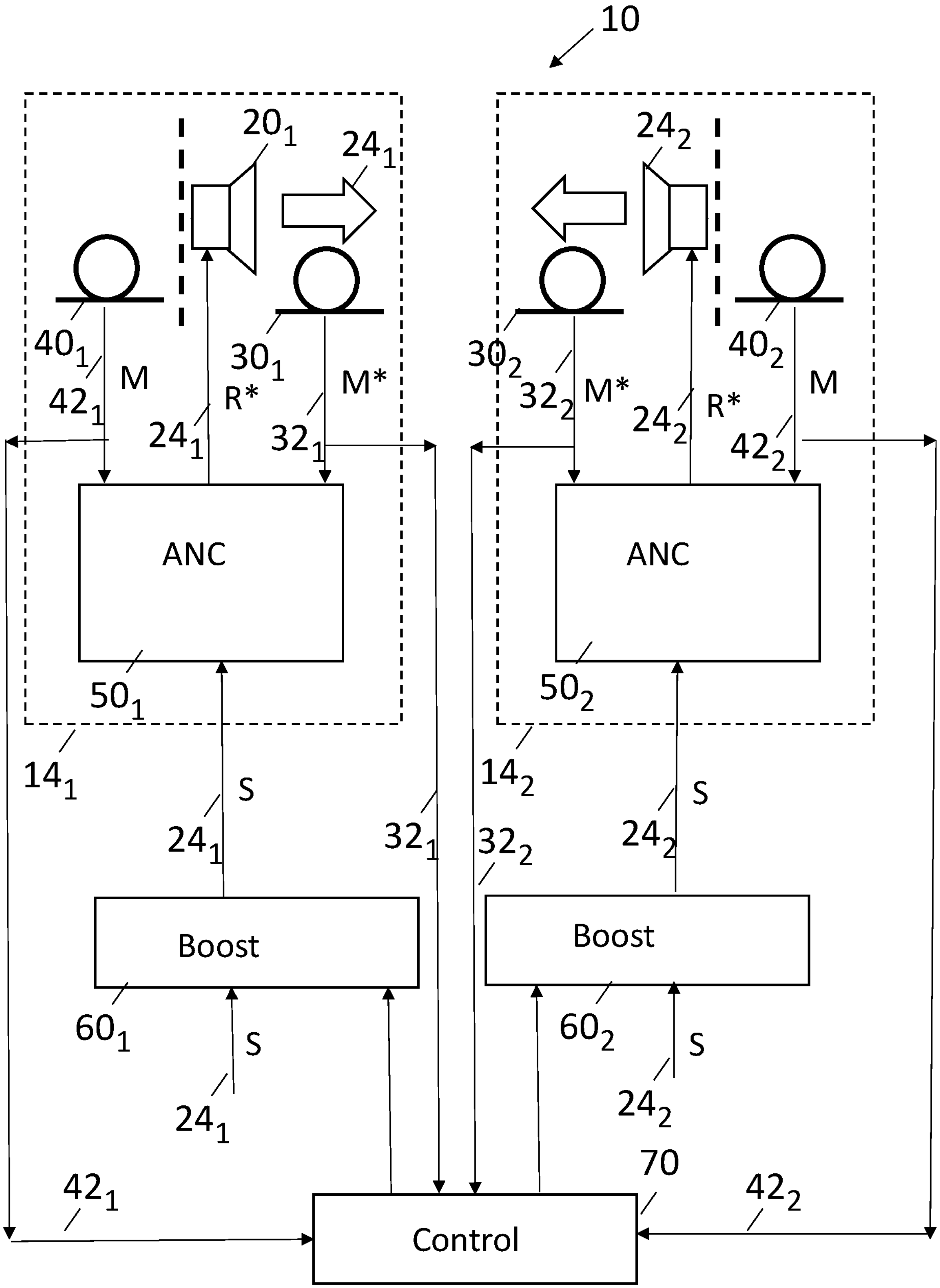
FIG. 3 shows another example of the subject matter described herein.

FIGS. 2 and 3 illustrates an example of the apparatus 10 as illustrated in FIG. 1. This apparatus 10 is for performing active noise cancellation for both ears—the left ear and the right ear of the user. The ANC can be performed for both ears simultaneously or can be performed only on one of the ears. The apparatus 10 illustrated in FIG. 3 is very similar to that illustrated in FIG. 2 and similar features have the same references, The apparatus 10 comprises different ear devices 14$_1$, 14$_2$. Each ear device 14$_1$, 14$_2$ provides a sound barrier 12 as previously described. The ear devices 14$_1$, 14$_2$ can, for example, be on-ear, over-ear or in-ear devices.

The first ear device 14$_1$, comprises a first interior audio transducer 20$_1$, that produces first interior sound 22$_1$ in dependence upon a first sound signal 24$_1$, a first interior microphone 30$_1$ that produces first interior microphone signals 32$_1$ in dependence upon the sound field at the first interior microphone 30$_1$ and, optionally, a first exterior microphone 40$_1$ that produces first exterior microphone signals 42$_1$ in dependence upon the sound field at the first exterior microphone 40$_1$.

The second ear device 14$_2$, comprises a second interior audio transducer 20$_2$, that produces second interior sound 22$_2$ in dependence upon a second sound signal 24$_2$, a second interior microphone 30$_2$ that produces second interior microphone signals 32$_2$ in dependence upon the sound field at the second interior microphone 30$_2$ and, optionally, a second exterior microphone 40$_2$ that produces second exterior microphone signals 42$_2$ in dependence upon the sound field at the second exterior microphone 40$_2$.

In the following examples, it will be assumed that the ear device 14$_1$ is a left-ear device and that the ear device 14$_2$ is a right-ear device. However, in other examples, the device 14$_1$ is a right-ear device and that the device 14$_2$ is a left-ear device.

The first interior microphone signals 32$_1$ and the first exterior microphone signals 42$_1$ can be referred to using "left ear microphone signals". The term left ear microphone signal can therefore refer to the first interior microphone signal 32$_1$, the first exterior microphone signal 42$_1$, or both second interior microphone signal 32$_1$ and first exterior microphone signal 42$_1$ and can be replaced by one or more of these terms.

The first interior microphone 30$_1$ and the first exterior microphone 40$_1$ can be referred to using "left ear microphone". The term left ear microphone can therefore refer to the first interior microphone 30$_1$, the first exterior microphone 40$_1$, or both first interior microphone 30$_1$ and first exterior microphone 40$_1$ and can be replaced by one or more of these terms.

The second interior microphone signals 32$_2$ and the second exterior microphone signals 42$_2$ can be referred to using "right ear microphone signals". The term right ear microphone signal can therefore refer to the second interior microphone signal 32$_2$, the second exterior microphone signal 42$_2$, or both second interior microphone signal 32$_2$ and second exterior microphone signal 42$_2$ and can be replaced by one or more of these terms.

The second interior microphone 30$_2$ and the second exterior microphone 40$_2$ can be referred to using "right ear microphone". The term right ear microphone can therefore refer to the second interior microphone 30$_2$, the second exterior microphone 40$_2$, or both second interior microphone 30$_2$ and second exterior microphone 40$_2$ and can be replaced by one or more of these terms.

The apparatus 10 comprises one or more controllers 50 for ANC. The one or more controllers 50 is or are configured to automatically modify, for each ear, the sound signal 24 to fully or partially cancel the sound waves causing the interior noise. The modified sound signal, the controlled sound signal 54, is provided to the interior audio transducer 20. In this example, the first controller 50$_1$ is configured to automatically modify the first sound signal 24$_1$ and provide the first controlled sound signal 54$_1$ to the first interior audio transducer 20$_1$. In this example, the second controller 50$_2$ is configured to automatically modify the second sound signal 24$_2$ and provide the second controlled sound signal 54$_2$ to the second interior audio transducer 20$_2$.

A booster 60$_i$ is configured to boost a sound signal 24$_i$ for output into one ear in dependence upon one or more microphone signals 32$_j$, 42$_j$ captured at the other ear.

In the example illustrated in FIG. 2, booster 60$_i$ is configured to boost a sound signal 24$_i$ for output into one ear in dependence upon one or more exterior microphone signals 42$_j$ captured at the other ear. In the example illustrated in FIG. 3, booster 60, is configured to boost a sound signal 24$_i$ for output into one ear in dependence upon one or more exterior microphone signals 42$_j$ captured at the other ear and/or one or more interior microphone signals 32$_j$ captured at the other ear.

A booster 60$_i$ is configured to boost a sound signal 24$_i$ by increasing an average audio energy of the sound signal 24$_i$.

A controller 50$_i$ can be configured to boost a sound signal 24$_i$ by (i) adding more content to the sound signal 24$_i$ (ii) moving or panning content to the sound signal 24$_i$ from the sound signal 24$_j$ for the other ear (iii) amplifying the sound signal 24$_i$ (iv) frequency-selective amplification of the sound signal $24_i$ The boosted sound signal $24_i$ can be a left ear sound signal $24_1$, with the one or more exterior microphone signals $42_j$ being one or more right ear microphone signals $42_2$. The boosted sound signal $24_i$ can be a right ear sound signal $24_2$, with the one or more exterior microphone signals $42_j$ being one or more left ear microphone signals $42_1$.

The apparatus 10 therefore comprises:

means $60_1$ for receiving one or more right ear microphone signals $32_2$, $42_2$;

means $60_1$ for boosting a left ear audio output signal $24_1$ in dependence upon the received one or more right ear microphone signals $32_2$, $42_2$;

means $60_2$ for receiving one or more left ear microphone signals $32_1$, $42_1$;

means $60_2$ for boosting a right ear sound signal $24_2$ in dependence upon the received one or more left ear microphone signals $32_1$, $42_1$;

In some examples, a boost is applied on one side only e.g., the boost is applied on a less noisy side using the nosier microphone signal 32, 42. In some examples, a boost is selectively applied on one side only e.g., the boost is applied on a less noisy side using the nosier microphone signal 32, 42 or on both sides.

In the at least some examples, the booster $60_1$ for boosting a left ear sound signal $24_1$ in dependence upon the received one or more right ear microphone signals $32_2$, $42_2$ is configured to boost the left ear sound signal $24_1$, not the right ear sound signal $24_2$, in dependence upon the received one or more right ear microphone signals $32_2$, $42_2$ and the booster $60_2$ for boosting a right ear sound signal $24_2$ in dependence upon the received one or more left ear microphone signals $32_1$, $42_1$ is configured to boost the right ear sound signal $24_2$, not the left ear sound signal $24_1$, in dependence upon the received one or more left ear microphone signals $32_1$, $42_1$.

In at least some examples, the booster $60_1$ for boosting the left ear sound signal $24_1$ is configured to amplify the left ear sound signal $24_1$. In some but not necessarily all examples, the amplification can be dynamic. In some but not necessarily all examples, the amplification can be frequency selective.

In at least some examples, the booster $60_2$ for boosting the right ear sound signal $24_2$ is configured to amplify the right ear sound signal $24_2$. In some but not necessarily all examples, the amplification can be dynamic. In some but not necessarily all examples, the amplification can be frequency selective.

In some examples, the boosting of sound signals 24 is non-noisy selective. This method works when there is noise all-around and the noise level is not too loud so that overall boost may be applied to both the left and right sound signals $24_1$, $24_2$.

In other examples, the boosting of sound signals 24 is noisy selective. This method works when there is asymmetric noise.

Referring to FIG. 3, a controller 70 is configured to boost a sound signal $24_i$ for output into one ear in dependence upon one or more microphone signals $32_j$, $42_j$ captured at the other ear.

The controller 70 is microphone signals $32_j$, $42_j$ captured from both ears and is able to perform relative comparisons between them.

For example, in at least some examples, the apparatus 10 comprises means for:

determining a left-ear noise signal associated with the received one or more left ear microphone signals $32_1$, $42_1$;

determining right-ear noise signal associated with the received one or more right ear microphone signals $32_2$, $42_2$;

comparing the left-ear noise signal and the right-ear noise signal to determine if there is more noise to the left or to the right;

in dependence upon determining that there is more noise on the left than the right, boosting the right ear sound signal $24_2$ in dependence upon the received one or more left ear microphone signals $32_1$, $42_1$;

in dependence upon determining that there is more noise on the right than the left, boosting the left ear sound signal in dependence upon the received one or more right ear microphone signals $32_2$, $42_2$.

In some examples, when it is determined that there is more noise on the left than the right, the left ear sound signal $24_1$ is not boosted (or boosted less than the right ear sound signal $24_2$) and when it is determined that there is more noise on the right than the left, the right ear sound signal $24_2$ is not boosted (or boosted less than the left ear sound signal $24_1$).

In some examples, when it is determining that there is more noise on the left than the right, and the left ear sound signal $24_1$ exceeds a threshold, the left ear sound signal $24_1$ is not boosted (or boosted less than the right ear sound signal $24_2$) and when it is determined that there is more noise on the right than the left, and the right ear sound signal $24_2$ exceeds a threshold, the right ear sound signal $24_2$ is not boosted (or boosted less than the left ear sound signal $24_1$).

The noise signal for a particular ear can be determined by comparing the interior microphone signal 32 for that ear with the desired sound signal 24. The difference between the desired sound signal 24 and the interior microphone signal 32 represents the noise e.g., S−M*.

Determination of noise can be a determination of the sound signal energy that is leaked into the ear through the headphones and not cancelled by ANC from sources outside the ear device 14. Basically, it is the energy of the difference of the interior microphone signal 32, and the desired sound signal $24_i$.

The apparatus 10 can perform a variety of different functions. These functions can, for example, be performed by one or more boosters 60 or by a controller 70. The functions are provided as function blocks 90, 92, 94, 96, 98 in FIGS. 4A, 4B, 4C, 4D, 4E. An apparatus 10 can be configured to perform none or any one or more of these blocks 90, 92, 94, 96, 98.

Figure 4A:
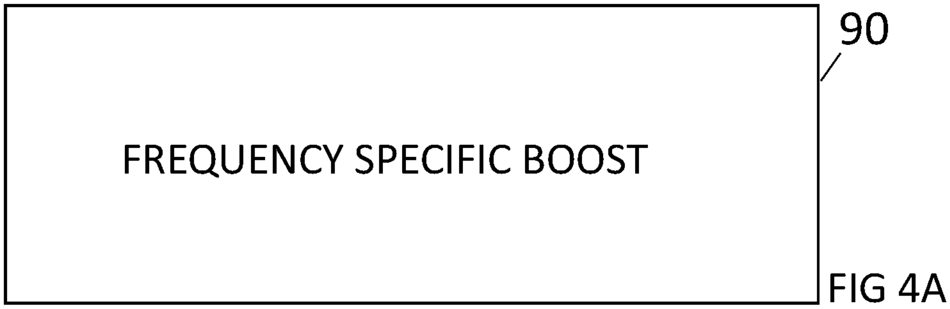
FIG. 4A to 4E show other examples of the subject matter described herein.

FIG. 4A illustrates an example of a block 90 for enabling a frequency specific boost.

A frequency-specific boost in one ear can compensate a noise frequency profile detected in the other ear In some but not necessarily all examples, the booster $60_2$ for boosting a right ear sound signal $24_2$ is configured to perform frequency-selective amplification on the right ear sound signal $24_2$. In at least some examples, the frequency-selection is dependent upon the received one or more left ear microphone signals $32_1$, $42_1$.

In some but not necessarily all examples, the booster $60_1$ for boosting a left ear sound signal $24_1$ is configured to perform frequency-selective amplification on the left ear sound signal $24_1$. In at least some examples, the frequency-selection is dependent upon the received one or more right ear microphone signals $32_2$, $42_2$.

In the case that there is significant ANC attenuation in the higher frequency range (>300 hz,) it is likely that ANC generates perceivable and unwanted artefacts in the higher frequency range. The level of boost applied to the higher frequencies can therefore be greater than the level of boost (if any) provided to the lower frequencies.

These artefacts can be detected in the interior microphone signals 32, fed-back to control the booster $\mathbf{60}_i$ and the frequency range where boosting does/does not occur can be varied based on the interior microphone signals $\mathbf{32}_j$ and/or the extent of boosting at different frequency ranges can be varied based on the interior microphone signals $\mathbf{32}_j$.

If the interior microphone signals $\mathbf{32}_j$ comprise a residual noise signal that is significant at a range of frequencies only, then boosting can be selectively applied to that range of frequencies only.

Boosting can therefore be used to mask the exterior environment sounds in general but also to avoid hearing higher frequency artefacts arising from the ANC process.

Figure 4B:

FIG. 4B illustrates an example of a block 92 for enabling a content specific boost.

In some but not necessarily all examples, the booster $\mathbf{60}_1$ for boosting a left ear sound signal $\mathbf{24}_1$ in dependence upon the received one or more right ear microphone signals $\mathbf{32}_2$, $\mathbf{42}_2$ is configured to add audio content from the right ear sound signal $\mathbf{24}_2$ to the left ear sound signal $\mathbf{24}_1$ and the booster $\mathbf{60}_2$ for boosting a right ear sound signal $\mathbf{24}_2$ in dependence upon the received one or more left ear microphone signals $\mathbf{32}_1$, $\mathbf{42}_1$ is configured to add audio content from the left ear sound signal $\mathbf{24}_1$ to the right ear sound signal $\mathbf{24}_2$.

In some but not necessarily all examples, the booster $\mathbf{60}_1$ for boosting a left ear sound signal $\mathbf{24}_1$ in dependence upon the received one or more right ear microphone signals $\mathbf{32}_2$, $\mathbf{42}_2$ is configured to move audio content from the right ear sound signal $\mathbf{24}_2$ to the left ear sound signal $\mathbf{24}_1$ (e.g., pan an instrument, music track or sound source from the right ear sound signal $\mathbf{24}_2$ to the left ear sound signal $\mathbf{24}_1$); and the booster $\mathbf{60}_2$ for boosting a right ear sound signal $\mathbf{24}_2$ in dependence upon the received one or more left ear microphone signals $\mathbf{32}_1$, $\mathbf{42}_1$ is configured to move audio content from the left ear sound signal $\mathbf{24}_1$ to the right ear sound signal $\mathbf{24}_2$ (e.g., pan an instrument, music track or sound source from the left ear sound signal $\mathbf{24}_1$ to the right ear sound signal $\mathbf{24}_2$).

In at least some examples, the selection of the instrument (or music track or sound source) for panning from right to left is dependent upon the received one or more right ear microphone signals $\mathbf{32}_2$, $\mathbf{42}_2$ and the instrument (or music tracks or sound source) for panning from left to right is dependent upon the received one or more left ear microphone signals $\mathbf{32}_1$, $\mathbf{42}_1$.

Figure 4C:
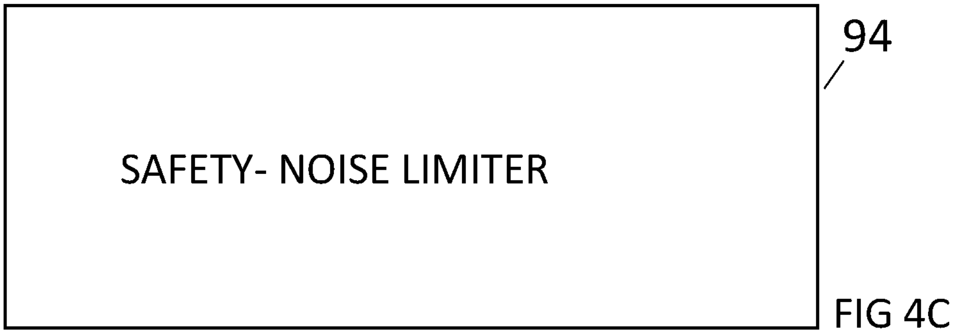

FIG. 4C illustrates an example of a block 94 for enabling a safety limiter.

The apparatus comprises an audio limiter block 94 configured to limit the output of the interior audio transducers $\mathbf{20}_1$, $\mathbf{20}_2$ to protect hearing. Different hearing protection algorithms can be used or mandated. The apparatus 10 comprises a limiter for preventing the output of one or both interior audio transducers $\mathbf{20}_1$, $\mathbf{20}_2$ exceeding a safety limit. In some examples, the safety limit is based on instantaneous output audio power (in some cases limited to specific frequency bands). In some examples the safety limit is additionally or alternatively based on an integration over time of output audio power (in some cases limited to specific frequency bands).

The audio limiter block 94, in at least some examples, is configured to maintain a headroom that can be used for boosting. For example, if the safety threshold is T and the headroom required for Boosting is B, then the operative threshold used to attenuate the audio output can be set to T-B, rather than T. The limiter can, for example, attenuate (e.g., 3 db) to create a headroom of (e.g., 3 db) for boosting.

One example of a threshold is to keep sound pressure levels below 85 db (typically A-weighted). One example of a threshold is to keep the cumulative sound energy less than what is caused by a sound source that measures 85 dB (A-weighted) over 8 hours.

The apparatus 10 can therefore be configured to attenuate the left ear sound signal $\mathbf{24}_1$ and the right ear sound signal $\mathbf{24}_2$ to create a safety headroom for boosting the left ear sound signal $\mathbf{24}_1$ in dependence upon the received one or more right ear microphone signals $\mathbf{32}_2$, $\mathbf{42}_2$ and/or boosting the right ear sound signal $\mathbf{24}_2$ in dependence upon the received one or more left ear microphone signals $\mathbf{32}_1$, $\mathbf{42}_1$.

Figure 4D:
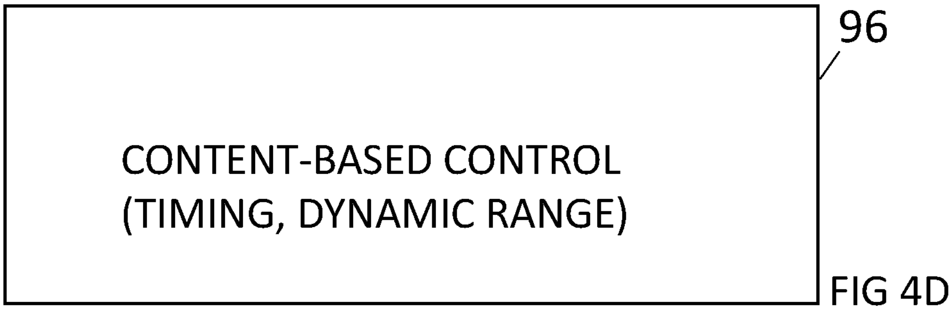

FIG. 4D illustrates an example of a block 96 for enabling content-based timing control.

The apparatus 10 can be configured to control the timing of when the boosting occurs.

For example, it may be desirable to apply or change the boost applied, either at a time when there is a pause in the respective sound signal 24 being boosted or at a time that is not a transient period (a period when there is a large change in audio energy—a large dynamic range) or at a time that is just before a transient period.

For example, a boost can be applied to a sound signal 24 during a speech pause. For example, a boost can be applied to a sound signal 24 before a beat in music (beats are the most transient periods in music).

For example, a boost can be applied to a sound signal 24 only during a period of low dynamic range (only when there is a relatively quite period).

The timing of when the boost occurs can alternatively or additionally be conditional on a trigger event. A trigger event can, for example, occur when a monitored parameter exceeds (in a positive sense or in a negative sense) a threshold.

Therefore in at least some examples, the apparatus 10 comprises means for controlling a timing of boosting the left ear sound signal $\mathbf{24}_1$ in dependence upon the received one or more right ear microphone signals $\mathbf{32}_2$, $\mathbf{42}_2$ and controlling a timing of boosting the right ear sound signal $\mathbf{24}_2$ in dependence upon the received one or more left ear microphone signals $\mathbf{32}_1$, $\mathbf{42}_1$, wherein if the left ear sound signal $\mathbf{24}_1$ or the right ear sound signal $\mathbf{24}_2$ comprises speech, boosting occurs at a pause in speech; and/or if the left ear sound signal $\mathbf{24}_1$ or the right ear sound signal $\mathbf{24}_2$ comprises music, boosting occurs immediately before beat in the music.

Figure 4E:
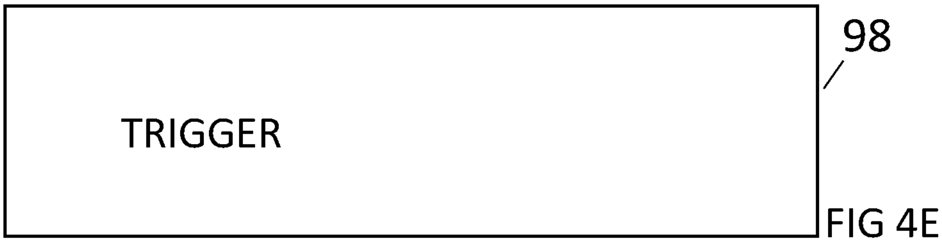

FIG. 4E illustrates an example of a block 98 for controlling triggering of boosting.

The trigger for boosting the right ear sound signal $\mathbf{24}_2$ in dependence upon the received one or more left ear microphone signals $\mathbf{32}_1$, $\mathbf{42}_1$ can, for example, be that a left-ear noise signal exceeds a first threshold.

The trigger for boosting the left ear sound signal $\mathbf{24}_1$ in dependence upon the received one or more right ear microphone signals $\mathbf{32}_2$, $\mathbf{42}_2$ can, for example, be that a right-ear noise signal exceeds a second threshold.

The first threshold can be a relative threshold set in comparison to the right-ear noise signal or can be an absolute threshold.

The second threshold can be a relative threshold set in comparison to the left-ear noise signal or can be an absolute threshold.

Therefore, the apparatus 10 can, for example, comprise means for:

determining a left-ear noise signal associated with the received one or more left ear microphone signals $\mathbf{32}_1$, $\mathbf{42}_1$;

comparing the left-ear noise signal to a first threshold;

in dependence upon determining that the left-ear noise signal exceeds the first threshold, boosting the right ear sound signal $\mathbf{24}_2$ in dependence upon the received one or more left ear microphone signals $\mathbf{32}_1$, $\mathbf{42}_1$;

determining right-ear noise signal associated with the received one or more right ear microphone signals $\mathbf{32}_2$, $\mathbf{42}_2$;

comparing the right-ear noise signal to a second threshold;

in dependence upon determining that the noise on the right exceeds the second threshold, boosting the left ear sound signal in dependence upon the received one or more right ear microphone signals $\mathbf{32}_2$, $\mathbf{42}_2$.

Figure 5:
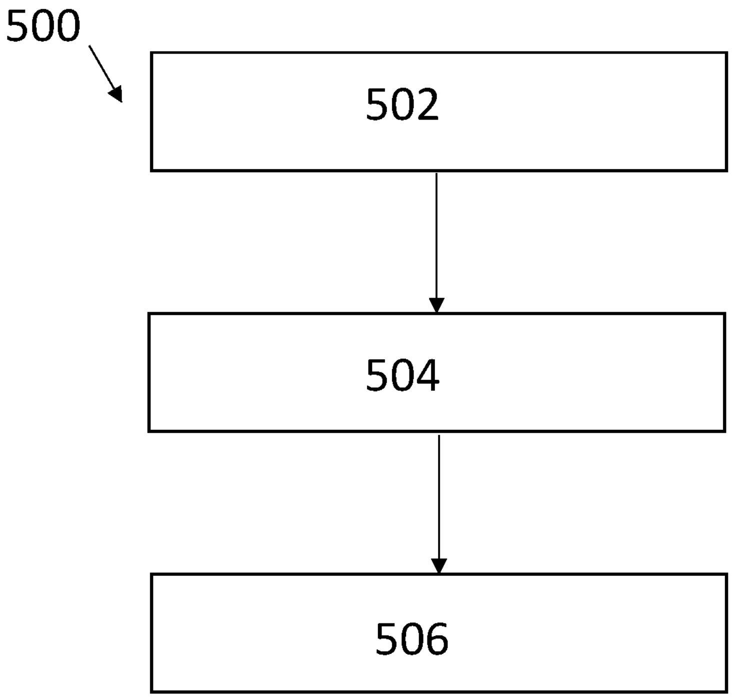
FIG. 5 shows another example of the subject matter described herein.

FIG. 5 illustrates an example of a method 500 comprising:

at block 502, receiving one or more left ear microphone signals $\mathbf{32}_1$, $\mathbf{42}_1$;

at block 504, receiving one or more right ear microphone signals $\mathbf{32}_2$, $\mathbf{42}_2$;

at block 506, boosting a left ear sound signal $\mathbf{24}_1$ in dependence upon the received one or more right ear microphone signals $\mathbf{32}_2$, $\mathbf{42}_2$ or a right ear sound signal $\mathbf{24}_2$ in dependence upon the received one or more left ear microphone signals $\mathbf{32}_1$, $\mathbf{42}_1$.

Masking is the boosting of a sound signal $\mathbf{24}_1$ at a first ear compared to a sound signal $\mathbf{24}_2$ at a second ear because of noise associated with the second ear.

This can be because the noise associated with the second ear is greater than the noise associated with the first ear.

The noise associated with the second ear can be assessed using second exterior microphone signals $\mathbf{42}_2$ from a second exterior microphone $\mathbf{40}_2$ and/or second interior microphone signals $\mathbf{32}_2$ from a second interior microphone $\mathbf{30}_2$.

The boosting of sound signal $\mathbf{24}_1$ at a first ear can have frequency characteristic that matches the frequency characteristic of the noise associated with the second ear. For example, if the noise associated with the second ear has a particular frequency spectrum (in the range of human hearing) then the boosting (amplification) of the sound signal $\mathbf{24}_1$ at the first ear can have the same or similar frequency spectrum. The amplification can occur in the frequency domain, for example.

In some examples, the noise associated with the second ear can comprise both environmental noise and process noise arising from ANC. The environmental noise is present in second exterior microphone signals $\mathbf{42}_2$ from the second exterior microphone $\mathbf{40}_2$ and/or second interior microphone signals $\mathbf{32}_2$ from the second interior microphone $\mathbf{30}_2$. The process noise is present on second interior microphone signals $\mathbf{32}_2$ from the second interior microphone $\mathbf{30}_2$.

In these examples, the boosting of the sound signal $\mathbf{24}_1$ at the first ear can have frequency characteristic that matches the frequency characteristic of the environmental noise and/or the process noise associated with the second ear. In some examples, the noise associated with the second ear can comprise only environmental noise or only process noise arising from ANC.

In some examples, frequency-selective filtering of the residual noise signal can be used to estimate ANC noise and/or environmental noise. ANC provides significantly more unwanted artefacts on higher frequencies that can be perceived by users e.g., 0.3-3 kHz.

In some examples, the apparatus 10 uses ANC frequency attenuation information to determine amount of boost for avoiding audible artefacts. It is likely that audible artefacts will occur when there is low-quality feedback from the interior microphone. The feedback loop can be modified by injecting some noise from the other ear. That is the sound signal for a first ear is boosted using the frequency profile of the interior microphone signal from the second ear. This avoid hearing higher frequency artefacts due to ANC process.

In some examples, audio leakage frequency characteristics from the ear device 14 (e.g., earbud) that has more audio leakage are used to boost the sound signal 24 playback content and will significantly mask the environment noise allowing with better listening experience without boosting the overall volume too much.

In some examples, if the audio leakage frequency characteristics from the second ear device $\mathbf{14}_2$ (e.g., earbud) has more audio leakage, then that audio leakage frequency characteristic is used to boost the sound signal $\mathbf{24}_1$ playback content associated with the first ear device $\mathbf{14}_1$.

The e.g., audio leakage frequency characteristics from the second ear device $\mathbf{14}_2$ can also be used to boost the sound signal $\mathbf{24}_2$ playback content associated with the second ear device $\mathbf{14}_2$ as well as the sound signal $\mathbf{24}_1$ playback content associated with the first ear device $\mathbf{14}_1$. The boost applied to the sound signal $\mathbf{24}_1$ rendered at the first ear can be greater than the boost applied to the sound signal $\mathbf{24}_2$ rendered at the second ear. This method works when there is noise all-around and the noise level is not too loud so that overall boost may be applied.

In some examples, if the audio leakage frequency characteristics from the second ear device $\mathbf{14}_2$ (e.g., earbud) has more audio leakage, then that audio leakage frequency characteristic is used to boost only the sound signal $\mathbf{24}_1$ playback content associated with the first ear device $\mathbf{14}_1$. There is no boosting of the sound signal $\mathbf{24}_2$ playback content associated with the second ear device $\mathbf{14}_2$.

This is particularly advantageous when there is loud environment on one side. In this scenario, boosting signals in both ear device 14 could provide suboptimal listening outcome. Only the sound signal 24 (playback signal) rendered at the ear device 14 (e.g., earbud) that has less environmental leakage noise needs to be boosted. It has been found by experiment, that due to the high environment noise level a user can not easily perceive panning of the signal due to volume difference (i.e., boosting only one ear device 14 regardless of the sound signal 24 (playback signal) characteristics). A boost to the sound signal 24 rendered at the ear device 14 (e.g., earbud) having less audio leakage creates a significant difference in the perceived overall audio volume and makes the content consumption better/easier. Also, boosting only from one side reduces the amount of overall signal boost.

The decision of whether or not to boost one or both of the e.g., sound signals 24 rendered from the respective ear devices 14 can be dependent upon the overall volume and/or if the environment noise is affecting one ear device 14 more than another. If there is significant environment noise coming from one side, boosting sound signal 24 playback content only in the other ear device 14 (e.g., earbud) that has less leak will increase the overall volume perception significantly without having notable problems in change of content panning.

The above-described examples provided improved audio content consumption in noisy environments. In at least some examples, there is also limiting the output for hearing protection. If the overall volume is close to a maximum (safe listening volume), a limiter can be used to compress the overall output to be able to boost (e.g., 3 db) more.

The apparatus 10 also provides time-dependent adaptation to content characteristics. This can be dependent upon time-variable characteristics of the rendered content. For example, the user experience of switching on and/or switching off boosting is better if the boosting can be applied right before a beat in music or during a short pause in speech e.g., for speech signals, gaps between words can be used instead of beats.

When the sound signal 24 playback content has large dynamic differences, then the boosting applied can be dynamically varied to adapt to the dynamic range differences. For example, the likelihood of boosting and/or the extent of boosting the amplification used) can be greater when the playback content is quiet compared to when the playback content is loud.

Boosting can be sound source based. For example, a sound source (e.g., a sound track or a sound object) at the first ear can be boosted (amplified) because of noise associated with the second ear. The selection of the sound source to be boosted can be selected because it has a frequency characteristic that is similar to or most similar to the frequency characteristic of the noise associated with the second ear.

For example, a sound source (e.g., a sound track or a sound object) can be moved to a sound signal $\mathbf{24}_1$ at the first ear from the sound signal $\mathbf{24}_2$ at the second ear because of noise associated with the second ear. The selection of the sound source to be moved can be selected because it has frequency characteristic that are similar to or most similar to the frequency characteristic of the noise associated with the second ear or because it is flagged by metadata or otherwise recognized as an important audio component e.g., speech. The sound source can be moved by panning. In some examples, the sound source that is moved may be an individual instrument. The instrument selected can be selected based matching to a frequency spectrum of noise.

The sound source can exist in audio content (e.g. multi-track music, object-based audio, channel-based audio, metadata assisted spatial audio, . . . ) or the sound source can be separated by processing the audio content (e.g. using audio source separation). This can provide control over individual instruments, audio objects or other audio sources.

The apparatus 10 can be configured to select the object(s) that best match the residual noise signal frequency characteristics and boost the volume (intensity level) of those object(s) as a whole (e.g. non-frequency selective amplification) rather than boosting only selected frequencies matched to the frequency spectrum of the residual noise spectrum. The sound sources can also be panned towards the ear device 14 having less audio leak. In modern music it is not that common to pan fully left-right so in many cases a slight pan and boosting of an instrument in one ear device 14 (e.g. earbud) will work well.

In some but not necessarily all examples, the boosting of the sound signal 24 for one ear (e.g. first ear) in dependence upon the received one or more microphone signals of the other ear (e.g. second ear), is conditional. The first ear can be a left ear or a right ear.

For example, in some but not necessarily all examples, the boosting of the sound signal $\mathbf{24}_1$ for the first ear in dependence upon the received one or more microphone signals $\mathbf{32}_2$, $\mathbf{42}_2$ of the second ear, occurs if the residual noise at the inside of the ear device 14 of the first ear exceeds a threshold. The comparison can be a comparison of the absolute residual noise against an absolute threshold and/or a comparison of relative residual noise against a relative threshold. The relative residual noise can be a based on a ratio of the absolute residual noise to a level of the sound signal 24 that is rendered at the threshold ear device 14 of the first ear.

For example, in some but not necessarily all examples, the boosting of the sound signal $\mathbf{24}_1$ for the first ear in dependence upon the received one or more microphone signals $\mathbf{32}_2$, $\mathbf{42}_2$ of the second ear, does not occur if the residual noise at the inside of the ear device 14 of the first ear is already largely compensated by the rendering of the sound signal 24 rendered at the second ear. This can be because the sound signal 24 rendered at the second ear already has higher levels compared to the residual noise, for example, at the frequencies occupied by the residual noise.

Figure 6:
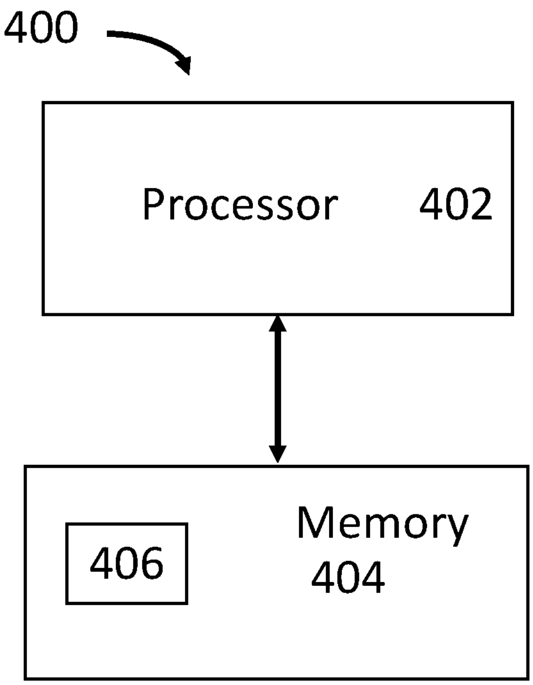
FIG. 6 shows another example of the subject matter described herein.

FIG. 6 illustrates an example of a controller 400 suitable for use in an apparatus 10. The controller 400 can, for example provide the functionality of one or both controllers $\mathbf{50}_1$, $\mathbf{50}_2$. The controller 400 can, for example provide the functionality of booster 60.

Implementation of a controller 400 may be as controller circuitry. The controller 400 may be implemented in hardware alone, have certain aspects in software including firmware alone or can be a combination of hardware and software (including firmware).

As illustrated in FIG. 6 the controller 400 may be implemented using instructions that enable hardware functionality, for example, by using executable instructions of a computer program 406 in a general-purpose or special-purpose processor 402 that may be stored on a computer readable storage medium (disk, memory etc.) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 10 when loaded into the processor 402. The computer program instructions, of the computer program 406, provide the logic and routines that enables the apparatus to perform the methods illustrated in the Figs. The processor 402 by reading the memory 404 is able to load and execute the computer program 406.

The apparatus 10 therefore comprises:

at least one processor 402; and at least one memory 404 including computer program code the at least one memory 404 and the computer program code configured to, with the at least one processor 402, cause the apparatus 10 at least to perform:

receiving one or more left ear microphone signals $\mathbf{32}_1$, $\mathbf{42}_1$;

receiving one or more right ear microphone signals $\mathbf{32}_2$, $\mathbf{42}_2$;

boosting a left ear sound signal in dependence upon the received one or more right ear microphone signals $\mathbf{32}_2$, $\mathbf{42}_2$ or a right ear sound signal in dependence upon the received one or more left ear microphone signals $\mathbf{32}_1$, $\mathbf{42}_1$.

Figure 7:
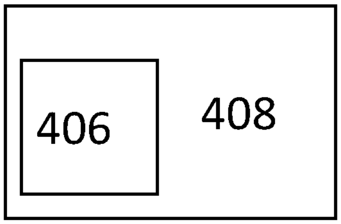
FIG. 7 shows another example of the subject matter described herein.

As illustrated in FIG. 7, the computer program 406 may arrive at the apparatus 10 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus 10 may propagate or transmit the computer program 406 as a computer data signal.

Computer program instructions for causing an apparatus to perform at least the following or for performing at least the following:

boosting a left ear sound signal in dependence upon a received one or more right ear microphone signals $\mathbf{32}_2$, $\mathbf{42}_2$;

boosting a right ear sound signal in dependence upon a received one or more left ear microphone signals $\mathbf{32}_1$, $\mathbf{42}_1$.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the Figs may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user.

The above-described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning.

That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus comprising:

at least one processor; and at least one memory storing instructions that, when executed by the at least one processor, cause the apparatus at least to perform:

receiving one or more left ear microphone signals from a left ear device;

receiving one or more right ear microphone signals from a right ear device;

determining a left ear noise signal associated with the received one or more left ear microphone signals, the left ear noise signal based on a difference between a first interior microphone signal from the left ear device and a first sound signal applied to a first transducer for the ear device;

determining a right ear noise signal associated with the received one or more right ear microphone signals, the right ear noise signal based on a difference between a second interior microphone signal from the right ear device and a second sound signal applied to a second transducer for the right ear device;

comparing the left ear noise signal and the right ear noise signal to determine that a determined one of the left ear device or the right ear device should have its ear sound signal boosted relative to an other of the left ear device or the right ear device and its ear sound signal; and boosting the ear sound signal for the determined ear device in dependence upon received one or more ear microphone signals from the other ear devices.

2. An apparatus as claimed in claim 1, wherein the boosting the ear sound signal for the determined ear device in dependence upon the received one or more ear microphone signals from the other ear device is further caused to boost the ear sound signal for the determined ear device, not the ear sound signal for the other ear device, in dependence upon the received one or more ear microphone signals for the other ear device.

3. An apparatus as claimed in claim 1, wherein the boosting the ear sound signal for the determined ear device in dependence upon the received one or more ear microphone signals from the other ear device is further caused to add audio content to the ear sound signal for the determined ear device from the ear sound signal from the other ear device.

4. An apparatus as claimed in claim 1, wherein the boosting the ear sound signal for the determined ear device in dependence upon the received one or more ear microphone signals from the other ear device is further caused to move audio content from the ear sound signal from the other ear device to the ear sound signal for the determined ear device.

5. An apparatus as claimed in claim 4, wherein the boosting the ear sound signal for the determined ear device in dependence upon the received one or more ear microphone signals from the other ear device is further caused to pan an instrument from the ear sound signal from the other ear device to the ear sound signal for the determined ear device.

6. An apparatus as claimed in claim 1, wherein the boosting the ear sound signal for the determined ear device is further caused to amplify the ear sound signal for the determined ear device.

7. An apparatus as claimed in claim 1, wherein the boosting the ear sound signal for the determined ear device is further caused to perform frequency-selective amplification on the ear sound signal for the determined ear device.

8. An apparatus as claimed in claim 1, wherein the boosting the ear sound signal for the determined ear device is further caused to perform frequency-selective amplification on the ear sound signal for the determined ear device, wherein the frequency-selective amplification is dependent upon the received one or more ear microphone signals from the other ear device.

9. An apparatus as claimed in claim 1, wherein:

the comparing comprises comparing the left ear noise signal and the right ear noise signal to determine that there is more noise on the other ear device as compared to the noise on the determined ear device.

10. An apparatus as claimed in claim 1, wherein:
the comparing comprises comparing the left ear noise signal to a first threshold;
in dependence upon determining that the left ear noise signal exceeds the first threshold, the determined one of the left ear device or right ear device is the right ear device and the boosting comprises boosting a right ear sound signal in dependence upon the received one or more left ear microphone signals;
the comparing comprises comparing the right ear noise signal to a second threshold; and
in dependence upon determining that the right ear noise signal exceeds the second threshold, the determined one of the left ear device or the right ear device is the left ear device and the boosting comprises boosting a left ear sound signal in dependence upon the received one or more right ear microphone signals.

11. An apparatus as claimed in claim 10,
wherein the first threshold is a relative threshold set in comparison to noise from the right ear device or is an absolute threshold and
wherein the second threshold is a relative threshold set in comparison to noise from the left ear device or is an absolute threshold.

12. An apparatus as claimed in claim 1, wherein the at least one memory further stores instructions that, when executed by the at least one processor, cause the apparatus at least to perform:
attenuating a left ear sound signal and a right ear sound signal to create a safety headroom for boosting the ear sound signal for the determined ear device in dependence upon the received one or more ear microphone signals from the other ear device.

13. An apparatus as claimed in claim 1, wherein the at least one memory further stores instructions that, when executed by the at least one processor, cause the apparatus at least to perform:
controlling a timing of boosting the ear sound signal for the determined ear device in dependence upon the received one or more ear microphone signals from the other ear device, wherein
when the ear sound signal for the determined ear device or the ear sound signal from the other ear device comprises speech, the boosting occurs at a pause in speech; or
when the ear sound signal for the determined ear device or the ear sound signal from the other ear device comprises music, the boosting occurs immediately before a beat in the music.

14. A method comprising:
receiving one or more left ear microphone signals from a left ear device;
receiving one or more right ear microphone signals from a right ear device;
determining a left ear noise signal associated received one or more left ear microphone signals, the left ear noise signal based on a difference between a first interior microphone signal from the left ear device and a first sound signal applied to a first transducer for the left ear device;
determining a right ear noise signal associated with the received one or more right ear microphone signals, the right ear noise sign mal based on a difference between a second interior microphone signal from the right ear device and a second sound signal applied to a second transducer for the right ear device;
comparing the left ear noise signal and the right ear noise signal to determine that a determined one of the left ear device or the right ear device should have its ear sound signal boosted relative to an other of the left ear device or the right ear device and its ear sound signal; and
boosting the ear sound signal for the determined ear device in dependence upon received one or more ear microphone signals from the other ear device.

15. A method as claimed in claim 14,
wherein the boosting the ear sound signal for the determined ear device in dependence upon the received one or more ear microphone signals from the other ear device is further caused to boost the ear sound signal for the determined ear device, not the ear sound signal from the other ear device, in dependence upon the received one or more ear microphone signals from the other ear device.

16. A method as claimed in claim 14,
wherein the boosting the ear sound signal for the determined ear device in dependence upon the received one or more ear microphone signals from the other ear device is further caused to add audio content to the ear sound signal for the determine ear device from the ear sound signal from the other ear device.

17. A method as claimed in claim 14,
wherein the boosting the ear sound signal for the determined ear device in dependence upon the received one or more ear microphone signals from the other ear device is further caused to move audio content from the ear sound signal from the other ear device to the ear sound signal for the determined ear device.

18. A method as claimed in claim 17,
wherein the boosting the ear sound signal for the determined ear device in dependence upon the received one or more ear microphone signals from the other ear device is further caused to pan an instrument from the ear sound signal from the other ear device to the ear sound signal for the determined ear device.

19. A method as claimed in claim 14,
wherein the boosting the ear sound signal for the determined ear device is further causing to amplify the ear sound signal for the determined ear device.

20. A non-transitory computer readable medium comprising program instructions stored thereon for causing an apparatus to perform at least the following:
receiving one or more left ear microphone signals from a left ear device;
receiving one or more right ear microphone signals from a right ear device;
determining a left ear noise signal associated with the received one or more left ear microphone signals, the left ear noise signal based on a difference between a first interior microphone signal from the left ear device and a first sound signal applied to a first transducer for the left ear device;
determining a right ear noise signal associated with the received one or more right ear microphone signals, the right ear noise signal based on a difference between a second interior microphone signal from the right ear device and a second sound signal applied to a second transducer for the right ear device;
comparing the left ear noise signal and the right ear noise signal to determine that a determined one of the left ear device or the right ear device should have its ear sound signal boosted relative to an other of the left ear device or the right ear device and its ear sound signal; and boosting the ear sound signal for the determined ear device in dependence upon received one or more ear microphone signals from the other ear device.

* * * * *